J. C. GORDON.
BARREL CART.
APPLICATION FILED OCT. 4, 1918.
1,342,437.
Patented June 8, 1920.
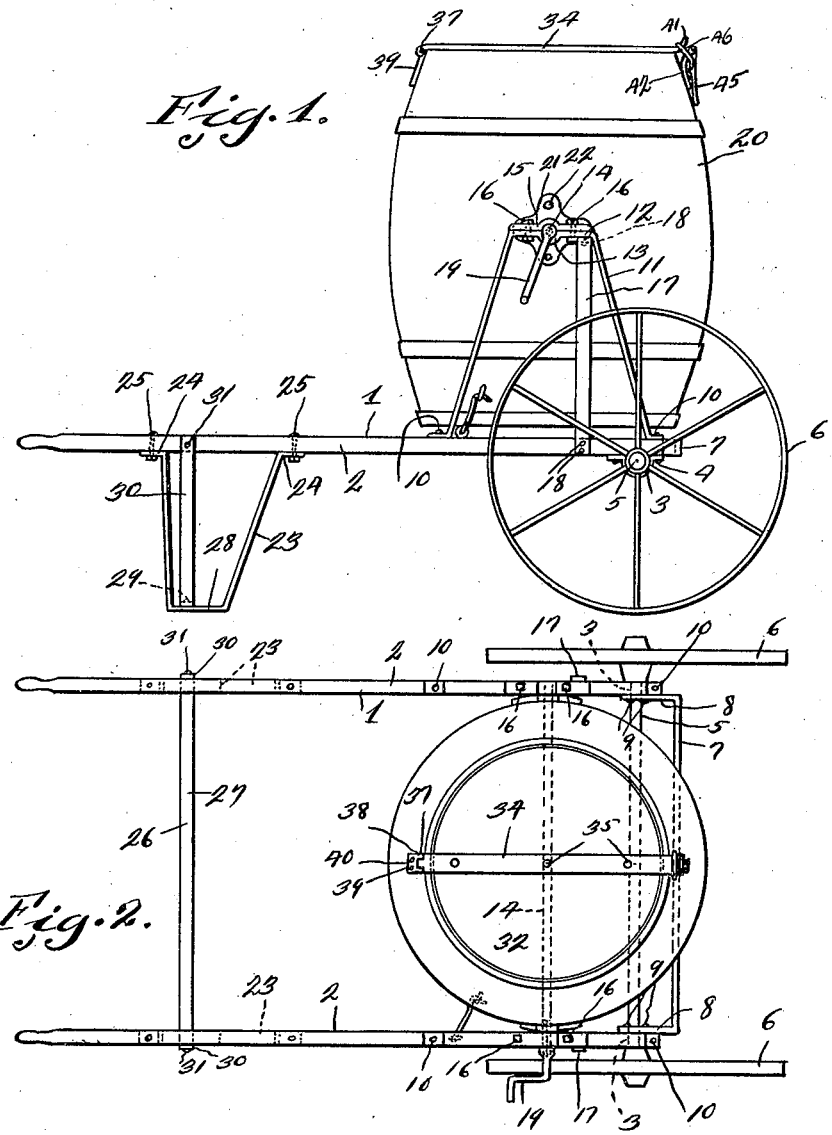
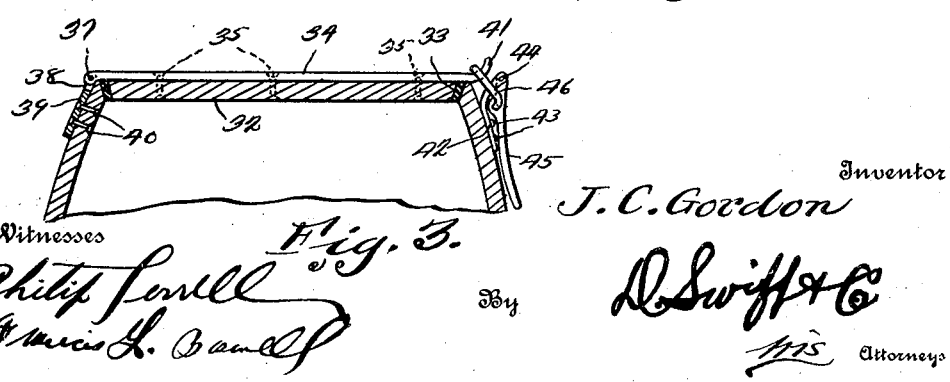
Witnesses
Inventor
J. C. Gordon
By D. Swift & Co.
Attorneys

UNITED STATES PATENT OFFICE.

JAMES C. GORDON, OF MONMOUTH, ILLINOIS.

BARREL-CART.

1,342,437.  Specification of Letters Patent.  Patented June 8, 1920.

Application filed October 4, 1918. Serial No. 256,888.

*To all whom it may concern:*

Be it known that I, JAMES C. GORDON, a citizen of the United States, residing at Monmouth, in the county of Warren, State of Illinois, have invented a new and useful Barrel-Cart; and I do hereby declare the following to be a full, clear, and exact description of the invention, such as will enable others skilled in the art to which it appertains to make and use the same.

The object of the invention is to provide a simple, efficient device of this kind for carrying barrels of water and the like.

A further object of the invention is to provide a cart on which a barrel or other receptacle is rotatably mounted for the reception of any material, whereby the material may be mixed thoroughly, either by rotating or rocking the barrel.

A further object of the invention is to provide means for detachably mounting a barrel or other receptacle on the cart, so that the receptacle may be removed, and the cart employed as a lifting or carrying apparatus.

A further object of the invention is the provision of means for supporting the frame of the cart when at a standstill, and means for holding the barrel or other receptacle against being rotated or rocked.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the improved cart, showing the barrel or other receptacle applied thereto and constructed in accordance with the invention.

Fig. 2 is a plan view.

Fig. 3 is an enlarged detail sectional view of the upper end of the barrel or receptacle showing the water tight closure or lid.

Referring more especially to the drawings, 1 designates a cart frame comprising the elongated parallel side bars 2. In bearings 3 (which are secured to the under faces of the bars at their wheel carrying ends as at 4) is an axle or shaft 5, on which the supporting wheels 6 are journaled. A transverse bar 7 provided with right angle extending ends 8 is provided, and these ends 8 are secured at 9 to the adjacent faces of the side bars 2 at their rear ends. Secured or bolted as at 10 to the side bars 2 of the frame 1 are upright U-shaped supports 11, the transverse parts 12 of which have bearings 13, and mounted in said bearings is a shaft 14. Strap plates 15 arch the shaft 14, and have their end portions bolted or otherwise secured at 16 to the transverse parts 12, thereby holding the shaft rotatably mounted in its bearings. A brace bar 17 is secured to each transverse part 12 of each U-shaped support. These brace bars have their lower ends secured at 18 to the side bars 2 of the frame 1, thereby reinforcing the U-shaped supports. One end of the shaft 14 has a crank 19. This shaft 14 extends transversely of a barrel or other suitable receptacle 20, and carried by the shaft 14 adjacent the crank end thereof is a plate 21 having a plurality of arms which are secured at 22 to the side wall of the barrel, whereby the barrel or other receptacle is fixed to rotate with the shaft. Where the shaft 14 extends through the wall of the barrel at diametrically opposite points suitable packing glands (not shown) may be provided to insure the barrel or other receptacle water tight. By rotating the shaft 14 the barrel may be rotated to thoroughly mix the contents. However, by rocking the shaft an oscillatory motion may be imparted to the barrel. Legs substantially U-shaped and designated by the numeral 23 have the upper ends 24 of their arms secured by bolts 25 to the side bars 2 of the frame 1, and designed to support the frame 1 spaced above the ground when the supporting wheels 6 are not in motion. A U-shaped bar 26 has its transverse part 27 secured at its ends to the transverse parts 28 of the legs 23, as at 29. The upper ends of the arms 30 of the U-shaped bar 26 are secured at 31 to the side bars 2 of the frame 1, thereby bracing the legs 23. The barrel or other receptacle has an end closure 32, which is beveled and provided with a packing gasket 33. A metallic strap 34 is secured at 35 to the upper face of the closure, and one end of this strap is hinged at 37 between the forks 38 of the plate 39 which is secured at 40 to the barrel or other receptacle. The other end of the metallic strap terminates in an upwardly turned portion 41. A plate 42 is secured at 43 to the receptacle diametrically opposite the plate 39. The upper end of the plate 42 extends outwardly and upwardly and terminates in forks, between which as at 44 a lever 45 is pivoted. This lever has a closed loop link 46, adapted to engage the upturned end 41, whereby as the lever 45 is thrown down in the position shown in Fig. 3, the closure may be held secure.

The invention having been set forth what is claimed as new and useful is:—

In a device as set forth, comprising a frame in a horizontal plane and formed from a pair of spaced bars, one end of said bars being connected to each other and held in spaced relation to each other by a transversely disposed bar having ears longitudinally disposed and engaging the inner faces of the ends of the bars, an axle extending transversely of the frame and rotatably mounted in bearings thereof, said axle being adjacent the connected ends of the bars of the frame, the other end of the frame being provided with downwardly extending legs for maintaining the frame in a horizontal position, upstanding U-shaped brackets carried by the side bars and provided with bearings in alinement with each other, said bearings being located a substantial distance from the vertical center of the axle and its wheels, and located between said wheels and the supporting legs at the other ends of the frame, a revoluble receptacle mounted in the upstanding bracket bearing, manually operated crank for revolving said receptacle, the lower end of said receptacle being disposed above the top surface of the frame, said positioning of the pivotal point of the receptacle at a distance from the axle center allowing the rotation of the receptacle without danger of tilting of the frame, and means carried by one of the bars of the frame for holding the receptacle against movement.

In testimony whereof I have signed my name to this specification in the presence of two subscribing witnesses.

JAMES C. GORDON.

Witnesses:
 EUCLID N. COBB,
 J. W. CAMPBELL.